United States Patent Office 3,501,922
Patented Mar. 24, 1970

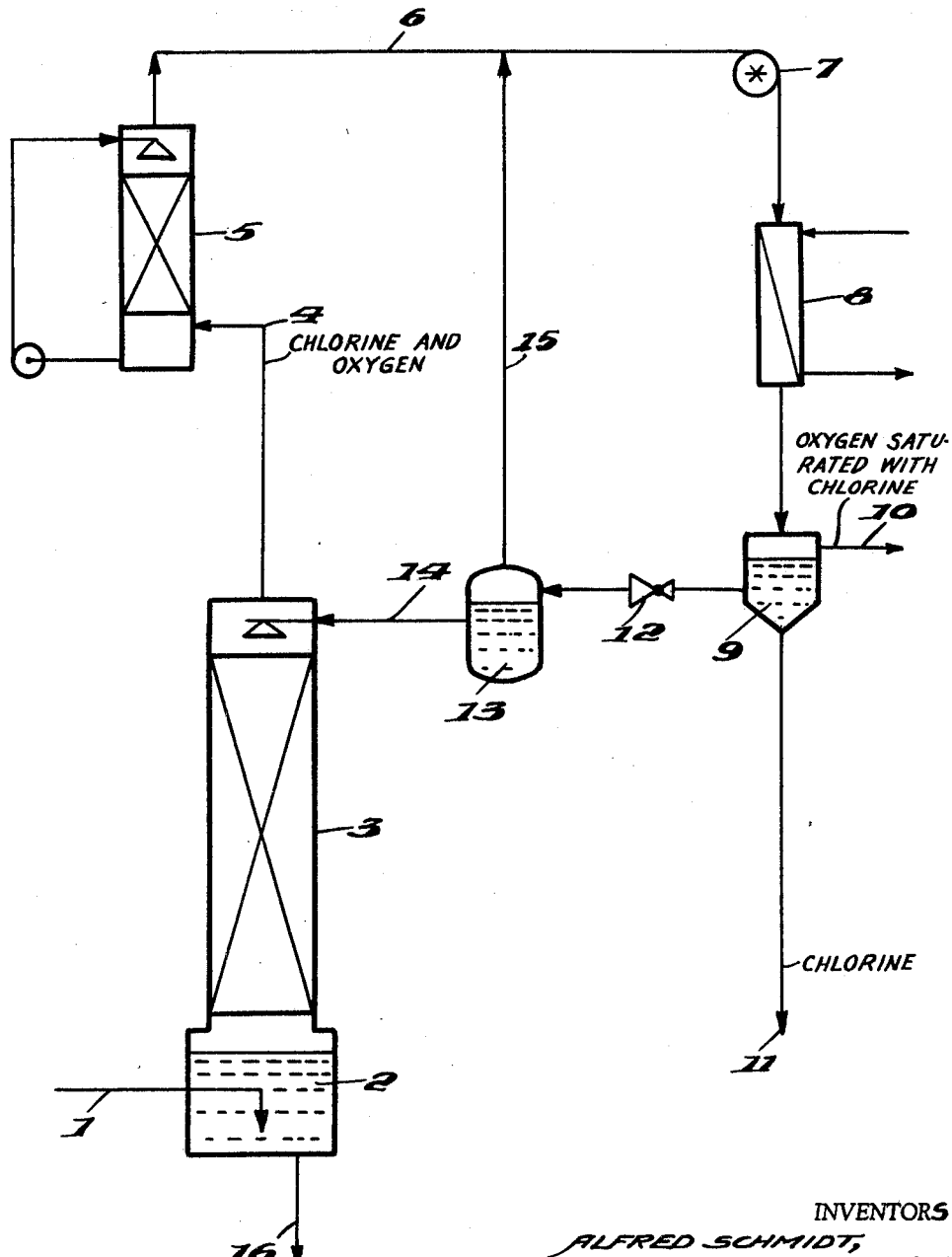

3,501,922
PROCESS FOR THE DISTILLATIVE SEPARATION OF PURE CHLORINE FROM A GAS MIXTURE CONTAINING CHLORINE, NITROGEN DIOXIDE, NITROSYL CHLORIDE AND OXYGEN
Alfred Schmidt and Ferdinand Weinrotter, Linz (Danube), and Walter Müller, Leonding, near Linz (Danube), Austria, assignors to Osterreichische Stickstoffwerke AG, Linz, Austria
Filed Mar. 14, 1968, Ser. No. 713,233
Claims priority, application Austria, May 23, 1967,
A 4,789
Int. Cl. F25j *3/08*, C01b *7/02, 21/53*
U.S. Cl. 62—17
4 Claims

ABSTRACT OF THE DISCLOSURE

Distillative separation of pure chlorine from a gas mixture containing chlorine, nitrogen dioxide, nitrosyl chloride and oxygen. Said gas mixture is introduced, at a temperature preferably 10 to 20° C. above its dew point, into the sump of a distillation column operating at atmospheric pressure thereby supplying the necessary heat of evaporation to the sump. The resulting mixture of chlorine and oxygen is withdrawn from the head of the column and the chlorine liquefied by compression and cooling.

Part of the liquid chlorine is expanded, thereby cooled to a temperature below its boiling point by partial evaporation at atmospheric pressure and introduced at the head of the column as a reflux in the liquid form.

---

This invention relates to a process for the distillative separation of chlorine from a gas mixture containing chlorine, nitrogen dioxide, nitrosyl chloride and oxygen.

Nitrosyl chloride is produced in large quantities from the reaction of chlorides with dinitrogen tetroxide or nitric acid. The nitrosyl chloride may, for example, be employed for the manufacture of chlorine. For this, the nitrosyl chloride is oxidised with oxygen, whereupon a gas mixture of chlorine, nitrogen dioxide, unreacted nitrosyl chloride and unconsumed oxygen is produced from which the chlorine has to be separated.

The distillative separation of chlorine from the mixture is easily possible because of the large difference in the boiling points of the individual components. Thus an oxygen-chlorine mixture can be withdrawn at the head of a column whereas a mixture of nitrosyl chloride and dinitrogen tetroxide remains in the sump of the column.

However difficulties arise in separating the oxygen and chlorine since the entering gas mixture must, depending on the partial pressure of the chlorine in the mixture, be cooled to a temperature of −36° to −60° C. in a pre-cooler in order to condense, whilst such condensation temperatures can only be achieved if brine which is a further 10° to 20° C. colder is used in the condenser. This however makes this type of separation impossible since very high operating and plant costs result.

It is furthermore known to carry out the separation under such a pressure, say at 10 to 20 atmospheres absolute, that the condenser can be fed with normal cooling water. In this case, however, unexpected difficulties arise since the entering gas still contains small quantities of water vapour in addition to the components mentioned. The difficulty arises since at elevated pressure 100% strength nitric acid forms from the water vapour and the dinitrogen tetroxide and oxygen which are present and the equipment cannot tolerate this acid. If on the other hand the process is carried out at normal pressure then a nitric acid of maximally 68% strength results.

However, even at normal pressure, the corrosion in the separating equipment is so great, because of the highly reactive nature of the components, that carrying out the distillation causes difficulties. Admittedly the walls of the vessels and of the column can be protected with ceramic materials or with synthetic resins but the requisite heat exchange surfaces, i.e., the gas pre-cooler, the reboiler in the column sump and the condenser at the head of the column must be manufactured of metallic materials and are subject to severe corrosion.

It has now been found that the above-mentioned difficulties can be eliminated and that normal cooling water suffices as the coolant if a starting mixture brought to an appropriate temperature is used for heating the sump and if the cooling of the distillation column is effected by liquid chlorine which has been cooled to a temperature below its boiling point by expansion of chlorine liquefied under pressure.

Accordingly, the present invention provides a process for the distillative separation of pure chlorine from a gas mixture containing chlorine, nitrogen dioxide, nitrosyl chloride and oxygen which comprises introducing the gas mixture, at a temperature above its dew point, preferably 10° to 20° C. above the dew point, into the sump of a distillation column operating at atmospheric pressure thereby supplying heat of evaporation to the sump, withdrawing the resulting mixture of chlorine and oxygen from the head of the column liquefying the chlorine therefrom by compression and cooling, separating the bulk of the chlorine from the remaining gaseous oxygen which under the existing conditions is saturated with chlorine, thereafter expanding a part of the liquid chlorine and thereby cooling it to a temperature below its boiling point at atmospheric pressure by partial evaporation, introducing this part of the chlorine at the head of the column as a reflux, in the liquid form, whilst the remainder of the chlorine liquefied under pressure is isolated as such and the mixture of nitrogen dioxide and nitrosyl chloride is withdrawn from the sump of the distillation column.

The dew point of the entering gas depends on its moisture content and is normally between 10° and 30° C. The temperature of the entering gas is therefore as a rule 15° to 50° C.

The amount of heat required for the evaporation is thus supplied to the sump liquid by the warm entering gas and not by means of a re-boiler. The gas mixture introduced is passed directly into the sump liquid, in complete contrast to the procedure in a normal distillation. A preceding condensation of the entering gas is not necessary. The possibility now exists of using columns which consist entirely of ceramic material or of synthetic resin. The separation of the components is carried out by withdrawing a gas mixture of chlorine and oxygen at the head of the distillation column, compressing it to 10 to 20 atmospheres excess and condensing out the chlorine by cooling by means of cooling water. The oxygen, which under the existing conditions is saturated with chlorine, is however withdrawn from the separating vessel as a gas and is either freed of chlorine in the usual manner or is returned to the oxidation process of the nitrosyl chloride. Whilst a part of the liquefied chlorine is withdrawn as pure product, the remainder is expanded to atmospheric pressure in an expansion valve, whereby the liquid chlorine is cooled to a temperature below its boiling point at atmospheric pressure by partial evaporation. This liquid chlorine, which is at a temperature of about −35° C., is introduced into the column as a reflux and the cooling required for the distillation is thereby achieved. As a rule 7 to 12 times the amount of chlorine which is introduced into the sump of the column with the entering mixture is charged in as reflux. A mixture of nitrogen dioxide and nitrosyl chloride, which may also still contain a small quantity of dissolved chlorine, is withdrawn from the sump of the distillation column.

The mixture of chlorine and oxygen which escapes at the head of the distillation column is, since the chlorine compression section consists of normal steel equipment, appropriately washed with concentrated sulphuric acid in order to ensure that in the event of any operating troubles no obnoxious or reactive gases, such as for example nitrosyl chloride or dinitrogen tetroxide, can pass into the compression section. This wash sulphuric acid must from time to time be changed.

The process according to the invention will be particularly described by reference to the accompanying drawing which illustrates an example of a suitable device for carrying out the process.

In the accompanying drawing, a gas mixture which is at a temperature above its dew point and which consists of chlorine, nitrogen dioxide, nitrosyl chloride and oxygen is introduced at 1 into the sump 2 of a distillation column 3 which works at atmospheric pressure. The sump liquid is provided with the amount of heat required for the evaporation by intimate mixing with the entering gas. The enterng gas is used for heating the sump liquid, whose temperature is 5° to 20° C. depending on the selected reflux ratio. A re-boiler in the sump is thus not necessary. The distillation column is of the simplest conceivable construction, since all parts which come into contact with the reactive gas mixture can be manufactured of ceramic material or of a synthetic resin. In principle any usual column may be employed, and packed columns have for example provide appropriate. A mixture of chlorine and oxygen escapes at the head, at 4, and is washed in a small wash tower 5 with circulated concentrated sulphuric acid. The product issuing at the head is in this way free of nitrosyl chloride and also of dinitrogen tetroxide, to the extent that these were present in the gas. The gas mixture passes through the pipeline 6 into the compressor 7, is compressed to 10 to 20 atmospheres excess, and the chlorine condenses out in the cooler 8, which is fed with normal cooling water, and is separated from gaseous oxygen saturated with chlorine in the subsequent separator 9. Gaseous oxygen saturated with chlorine issues from the separator via 10. This gas can be returned to the process of oxidation of the nitrosyl chloride. A part of the chlorine is withdrawn as a liquid product at 11. The remainder of the liquid chlorine is expanded to atmospheric pressure in the expansion valve 12. Hereupon about 20% of the liquid chlorine evaporates, whereby the temperature of the liquid chlorine falls below its boiling point, and this liquid chlorine, which is at a temperature of about −35° C. is fed into column 3 as a reflux, through pipeline 14. The amount of the reflux depends on the temperature at the head of the column.

The gaseous chlorine is again passed to the chlorine compression from the separator pot 13, via the pipeline 15. A mixture of nitrogen dioxide and nitrosyl chloride, which may also still contain a certain amount of dissolved chlorine, is withdrawn from the sump 2 of the distillation column 16. This mixture, containing 1 to 2% of chlorine, is further separated into dinitrogen tetroxide and a chlorine-nitrosyl chloride mixture, and the latter can be returned to the nitrosyl chloride oxidation. If the starting gas mixture contains a certain quantity of water, this does not interfere with the separation by distillation, and instead a corresponding quantity of an approximately 68% strength nitric acid is merely produced in the sump of the column.

The following example is given to illustrate the manner in which the invention may be carried out.

EXAMPLE

A gas mixture containing 1.99 kmole/hr. chlorine, 2.47 kmole/hr. nitrosyl chloride, 4.69 kmole/hr. nitrogen dioxide and 0.42 kmole/hr. oxygen is introduced at 1 into the sump 2 of the packed column which is made of glass and has a diameter of 500 mm. and a height of 3000 mm. Atmospheric pressure prevails in the column. The entering gas mixture, which contains about 0.1% of water, is at a temperature of 45° C. The sump temperature is 14° C. The amount of heat required for the evaporation is supplied to the sump liquid by means of the gas mixture introduced. 18.2 kmole/hr. of chlorine and 0.42 kmole/hr. of oxygen are drawn from the head of the column at 4, in the gaseous form and are washed with circulated sulphuric acid in the following wash tower 5.

The above-mentioned gas mixture passes through the pipeline 6 into the compressor 7, where it is compressed to 15 atmospheres absolute and is then cooled to 25° C. in the cooler 8 fed with cooling water. Hereupon the chlorine condenses out and is separated, in a separator 9, from uncondensed gas which contains 0.42 kmole/hr. of oxygen and, under these conditions, still contains 0.45 kmole/hr. of chlorine. This gas mixture can be returned to the process of oxidation of the nitrosyl chloride through pipeline 10. 1.44 kmole/hr. of chlorine in the liquid form are withdrawn at 11 and fed to a supply vessel. 20.4 kmole/hr. of liquid chlorine from 9 are expanded to atmospheric pressure in the expansion valve 12. 4.1 kmole/hr. of chlorine evaporate on expansion and are returned to the compression section via pipeline 15, whilst 16.3 kmole/hr. of liquid chlorine, now at a temperature of −35° C. are fed into the column as a reflux, through pipeline 14. 2.47 kmole/hr. of nitrosyl chloride, 4.69 kmole/hr. of nitrogen dioxide and 0.1 kmole/hr. of chlorine are withdrawn from the sump 2 of the distillation column at 16.

What we claim is:

1. A process for the distillative separation of pure chlorine from a gas mixture containing chlorine, nitrogen dioxide, nitrosyl chloride and oxygen, which comprises introducing the gas mixture, at a temperature above its dew point, into the sump of a distillation column operating at atmospheric pressure thereby supplying heat of evaporation to the sump, withdrawing the resulting mixture of chlorine and oxygen from the head of the column and liquefying the chlorine therefrom by compression and cooling, separating the bulk of the chlorine from the remaining gaseous oxygen which under the prevailing conditions is saturated with chlorine, thereafter expanding a part of the liquid chlorine and thereby cooling it to a temperature below its boiling point at atmospheric pressure by partial evaporation, introducing this part of the chlorine at the head of the column as a reflux, in the liquid form, whilst the remainder of the chlorine liquefied under pressure is isolated as such and the mixture of nitrogen dioxide and nitrosyl chloride is withdrawn from the sump of the distillation column.

2. A process according to claim 1, in which the gas mixture is introduced into the sump of the distillation column at a temperature 10° to 20° C. above the dew point.

3. A process according to claim 1, in which the gaseous product from the head of the column is washed with concentrated sulphuric acid before compression.

4. A process according to claim 1, in which 7 to 12 times the quantity of chlorine which is introduced into the distillation column with the starting mixture is introduced as a reflux at the head of the column.

References Cited

UNITED STATES PATENTS

| | | | |
|---|---|---|---|
| 1,876,551 | 9/1932 | Barstow | 62—23 |
| 2,150,669 | 3/1939 | Beekhuis. | |
| 3,260,057 | 7/1966 | Becker | 62—17 |
| 3,374,637 | 3/1968 | Wenzke | 62—23 |

FOREIGN PATENTS 1,384,578  11/1964  France.

NORMAN YUDKOFF, Primary Examiner
A. PURCELL, Assistant Examiner

U.S. Cl. X.R.

23—203, 219; 62—23